June 15, 1948.  W. H. GREEN  2,443,351
TIME DURATION PULSE TELEMETERING SYSTEM
Filed Feb. 23, 1946  2 Sheets-Sheet 1
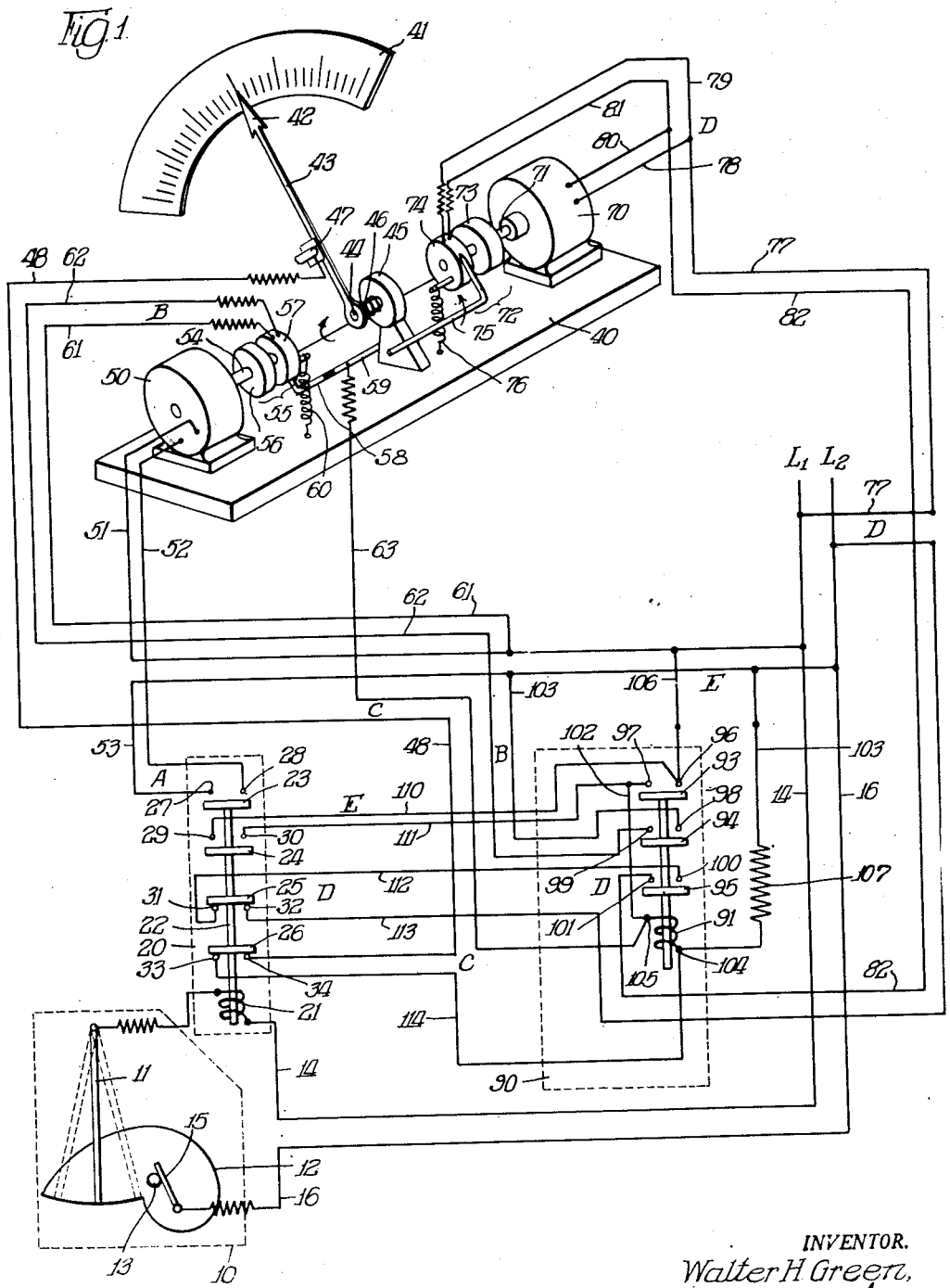
Fig.1
INVENTOR.
Walter H Green,
BY
ATTY.

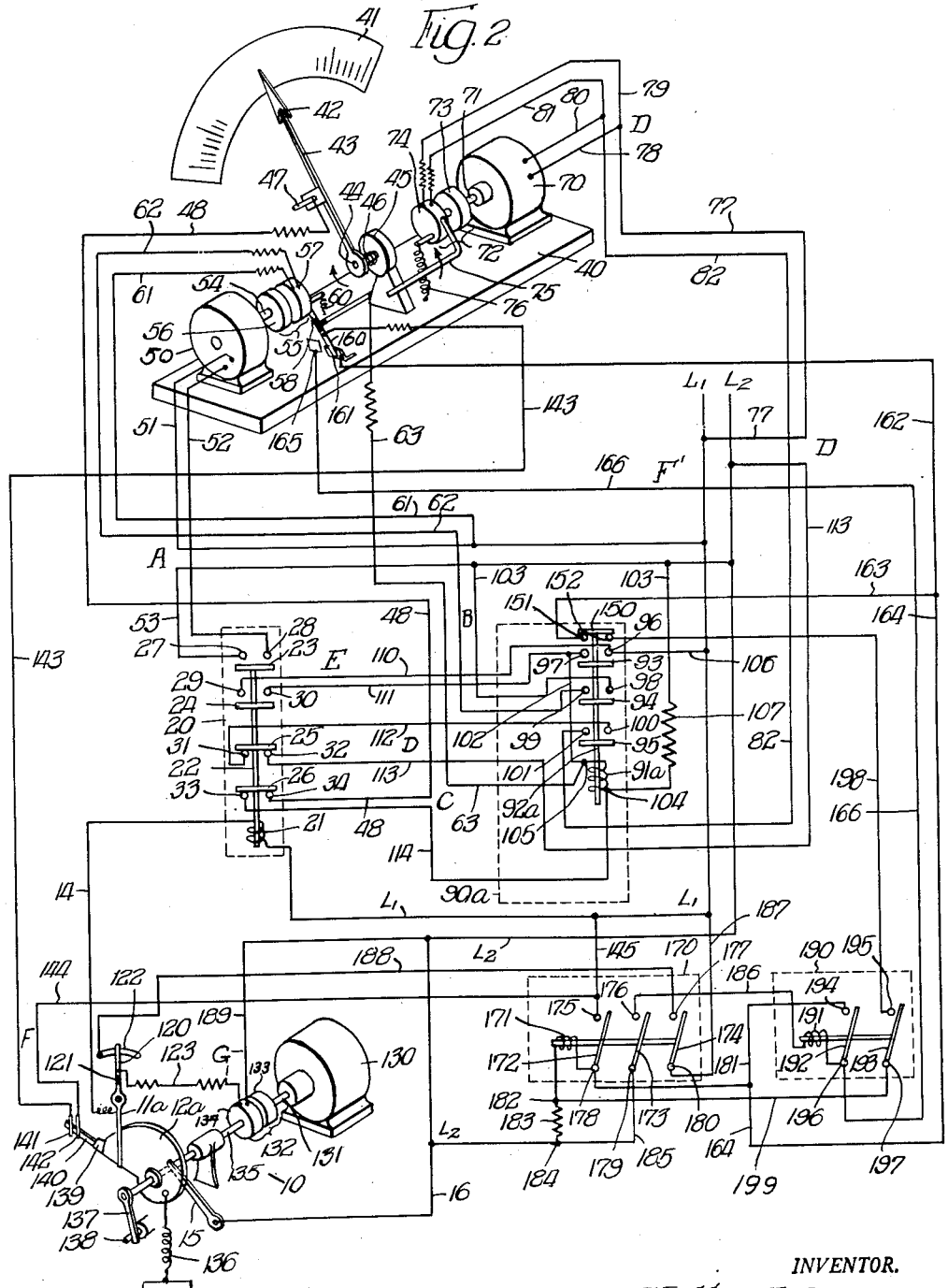
June 15, 1948.　　　W. H. GREEN　　　2,443,351
TIME DURATION PULSE TELEMETERING SYSTEM
Filed Feb. 23, 1946　　　2 Sheets-Sheet 2
INVENTOR.
Walter H. Green,
BY Patented June 15, 1948

2,443,351

UNITED STATES PATENT OFFICE 2,443,351

TIME DURATION PULSE TELEMETERING SYSTEM

Walter H. Green, Batavia, Ill., assignor to Infilco Incorporated, Chicago, Ill., a corporation of Delaware Application February 23, 1946, Serial No. 649,613

7 Claims. (Cl. 177—351)

This invention relates to a positioner or telemetric receiver.

An object of this invention is to provide means for positioning a movable member in accordance with a remote measurement of a variable quantity.

It is another object of this invention, in a remote telemetric receiver, or positioner, to provide an improved means for a quicker positioning of the receiver to a position corresponding to a rate of flow of liquid at the remote point.

Other objects of the invention will be apparent from the description and claims which follow.

Many telemetric receivers have been suggested by the prior art and devices of this nature fall into several classes. One of the classes is sometimes called the "automatic time interval" type, in which an impulse is initiated at regular intervals, such as one minute, by an electric clock and provides an impulse of a time duration corresponding to the quantity to be measured. When such a system is used with a positioner or indicator, it is customary for a pointer element to be positioned by an element driven by a synchronous motor running on current controlled by the sending, or transmitting, element which permits the flow of current for a period corresponding to the quantity to be measured; and a second element, moving in the opposite direction from the first, may operate to push the pointer in a reverse direction until it reaches the position of the first moving element. This latter movement is necessary to take care of those contingencies in which the quantity measured in any period is less than that of the preceding cycle. That is, if the positioner is pushed to a position by the previous cycle which corresponds to a greater quantity than that of the then present cycle, it is necessary to return the pointer a distance corresponding to the difference. In the past it has been customary to operate both moving elements on spaced time cycles so that a predetermined time, such as one minute, was always used to secure positioning of the pointer. My invention includes means for quickly positioning the pointer to a position corresponding to the flow rate and in one form to immediately initiate a new cycle. Thus where the quantity to be measured is low, the transmitting element can test the flow in very short cycles, therefore more accurately adjusting the positioner.

The apparatus of my invention can be used in the telemetering of various conditions, or the positioning of any kind of a movable member, but for purposes of illustration it will be described in connection with the measuring of a rate of flow of liquid and the positioning of a pointer indicating such quantity. My invention will be more readily understood from the description which follows and the drawings which form a part of this application.

Figure 1 is a diagrammatic isometric view of the apparatus of a simple form of my invention.

Figure 2 is a diagrammatic isometric view of another embodiment of my invention, wherein the time intervals are not constant but are dependent upon the then flow rate.

In my invention I may utilize a telemetric transmitter of any of the known designs which give a flow of current for a period proportional to the flow being measured. For example, in the use of my invention with an apparatus for measuring a rate of flow, it is customary to measure the flow by creating a pressure differential therein, such as by a Venturi tube. It is well known that the pressure varies as the square of the flow. However, it is still possible to secure a current of a time interval directly proportional to flow by several mechanisms. For purposes of illustration I show in Figure 1 a transmitter 10 which includes a contact arm 11 whose angular position from its zero or left-hand position varies as the square of the flow rate. A cam 12 is mounted on a shaft 13 which is driven at constant speed by any suitable means, such as a synchronous motor, not shown. The contour of the cam 12 is what is sometimes called a "square root cam," that is, one in which the length of time of contact between the contact arm 11 and the cam 12 is the square root of the position of the contact arm 11 (measured from the zero or no flow position) so that the length of time of contact between the arm 11 and the cam 12 is directly proportional to the rate of flow through the conduit. The contact arm 11 is connected to a source of power L₁ by a conductor 14 which includes coil 21 of a four pole relay 20. The cam 12 is connected to a source of power L₂ by any suitable means such as brush 15 and conductor 16, the brush 15 contacting either the shaft 13 or the cam itself. This circuit, which might be designated as the primary circuit, obviously is closed for the period during which the contact arm 11 contacts the cam 12. Thus the coil 21 of the relay is energized for a length of time proportional to the flow of fluid through the conduit.

The four pole relay 20 is of the non-interlocking type, the core 22 carrying four poles 23, 24, 25 and 26 as shown. Associated with pole 23 are contacts 27 and 28 while the contacts 29 and 30 are associated with pole 24. The relay is so constructed and arranged that when the coil 21 is deenergized the poles 23 and 24 are separated from their respective contacts, and the circuits including such contacts are open. Contacts 31 and 32 are associated with the pole 25 and contacts 33 and 34 are associated with pole 26. These two switches are normally closed when the coil 21 is deenergized, and the circuits including these switches are broken when the coil 21 is energized. Thus, energizing the coil 21 closes the circuits which include the poles 23 and 24 and opens the circuits including the poles 25 and 26 and conversely, deenergizing the coil 21 closes the circuits which include poles 25 and 26 and opens the circuits which include poles 23 and 24.

The positioner or telemetric receiver 40 includes a calibrated scale 41 with which is associated a pointer 42 carried on arm 43. The arm 43 is mounted on a shaft 44 suitably placed in the positioner, such as on a bracket 45. While the arm 43 is pivotally mounted with respect to the bracket 45 it is held against free rotation by some suitable means, such as spring 46, so that friction holds the arm in any position to which it is moved.

A synchronous or constant speed motor 50 is also mounted in the positioner 40. The motor 50 is connected to the source of power L1 by conductor 51 and to contact 28 by conductor 52. Contact 27 is connected to source of power L2 by conductor 53. For convenience, the circuit will be called circuit A. Thus, whenever the coil 21 of the relay 20 is energized (by contact of contact arm 11 with cam 12), circuit A is closed by the pole 23 and the motor 50 will rotate at a constant speed for the length of time that the contact arm 11 is in contact with the cam 12. As shown by the arrow, it rotates in a counterclockwise direction facing the drive shaft 54 of the motor.

One half 56 of a magnetic clutch 55 is rigidly mounted to the shaft 54 while the other half 57 is free to rotate with respect to the other half 56. The free half 57 of the clutch 55 is provided with an arm 58 having a contact 59. A tension spring 60 is connected to the free half 57 of the clutch 55 to return it to a zero position when it is deenergized.

The magnetic clutch 55 is connected to source of power L1 by conductor 61 and to source of power L2 through conductor 62, contact 99 of the relay 90, pole 94, contact 98 and conductor 103 (constituting circuit B). By means to be described below, circuit B is energized simultaneously with energizing of circuit A, but is deenergized independently of circuit A.

The relay 90 is of the three pole electrically interlocking type provided with a coil 91. This relay has three poles—93, 94 and 95. Associated with pole 93 are contacts 96 and 97; associated with pole 94 are contacts 98 and 99; and associated with pole 95 are contacts 100 and 101. As shown in the drawing all three poles are separated from their associated contacts when the coil 91 is deenergized.

The arm 43 also carries a contact 47 so positioned that the contact 59 carried by arm 58 will come in contact therewith when the arm 58 is rotated sufficiently to reach the arm 43. A wire 48 leads from the contact 47 to contact 34 of the relay 20. Contact 59 is connected by conductor 63 to binding post 105 to relay 90, and thence to source of power L1 as hereafter described. Conductor 114 connects contact 33 to binding post 104 of relay 90, and thence to source of power L2 as described hereafter. These form circuit C, which is closed when coil 21 is deenergized and contacts 47 and 59 are together.

It is obvious that while both the motor 50 and the magnetic clutch 55 are energized, the arm 58 is carried forward against the action of the spring 60. If the motor 50 should stop before the contact 59 on the motor driven arm 58 reaches contact 47 carried on positioned arm 43, the clutch 55 remains energized and the arm 58 will have been moved an angular position corresponding to the flow rate and remain there.

In opposed relationship to synchronous motor 50 is a second motor 70 which may be synchronous or non-synchronous as desired, but which will rotate at greater speed than the motor 50. The shaft 71 of the motor 70 likewise carries a magnetic clutch 72 one half 73 being rigidly secured to the shaft 71 while the other half 74 is free to rotate about the shaft. An arm 75 is mounted on the freely rotating half 74 of the clutch 72. A tension spring 76 is secured to the arm 75 or to the freely rotating half 74 of the clutch (as shown) to return the arm 75 to a zero position when the clutch is deenergized. The motor 70 and the clutch 72 are simultaneously energized and deenergized through circuit D. This circuit comprises, beginning at source of power L1, conductor 77, branch conductor 78 to the motor 70 and branch conductor 79 to the clutch 72; branch conductors 80 (from the motor) and 81 (from the clutch) join conductor 82, which leads to contact 101 of the relay 90; thence across pole 95, contact 100, conductor 112, contact 31 (of relay 20), pole 25, contact 32, and conductor 113 to source of power L2.

Contacts 29 and 30 of relay 20 are connected to contacts 96 and 97, respectively, of relay 90 by means of conductors 110 and 111, respectively. Contact 96 is also connected to source of power L1 through conductor 106 and contact 97 is connected to source of power L2 through conductor 102, binding post 105, coil 91, binding post 104, resistor 107, and conductor 103. This circuit, referred to as circuit E, constitutes an electrical interlock which is first closed when coil 21 is energized and then holds the circuit closed as pole 93 (of relay 90) short circuits contacts 29 and 30 (of relay 20).

At the zero position, just before the beginning of a cycle, the two motor driven arms 58 and 75 are at their zero position, and both motors 50 and 70 are stopped, the circuits serving both motors being deenergized. Likewise the two magnetic clutches 55 and 72 are deenergized. While the poles 25 and 26 (relay 20) are in contact with their respective contacts, the circuits D and C respectively, which include those poles are broken: the pole 95 of circuit D is separated from its contact points; and circuit C is broken between contact 59 and contact 47 of pointer arm 43 and also binding post 105 is disconnected from source of power L1. Thus at the beginning of a cycle all of the circuits are broken and the motors 50 and 70 and the magnetic clutches 55 and 72 are deenergized.

When the arm 11 comes in contact with the cam 12 the primary circuit (which includes the coil 21) is closed and relay 20 is energized. This raises the core, or plunger, 22 of the relay 20, so that pole 23 closes circuit A and pole 24 closes circuit E. Simultaneously circuits D and C are broken at the relay 20. Thus the energizing of the coil 21 in the primary circuit closes circuit A leading to motor 50, causing it to rotate. Simultaneously, the closing of circuit E energizes coil 91 of relay 90, so that all the contacts of this relay are bridged by their respective poles. Raising of pole 94 closes circuit B, which energizes magnetic clutch 55. Thus the motor 50 and its associated magnetic clutch are energized simultaneously.

In connection with the closing of circuit E, it will be noted that the bridging of the gap between contacts 96 and 97 by the pole 93 short circuits the portion of circuit E in relay 20, thus establishing a holding circuit for relay 90 leading from source of power L1 through conductor 106, contact 96, pole 93, contact 97, conductor 102, coil 91, resistor 107, conductor 103 back to L2. This constitutes an electrical interlock which maintains coil 91 of relay 90 energized when coil 21 of relay 20 becomes deenergized by the movement of the cam 12 away from the contact arm 11. Thus the motor 50 and the magnetic clutch 55 are simultaneously energized so that the arm, 58, is moved forward for the length of time that the contact 11 is in contact with the cam 12. That is, the arm 58 is moved forward at a constant rate for a period of time directly proportional to the rate of flow through a conduit which is being measured, since the length of time that the contact arm 11 is in contact with the cam, 12, is proportional to the rate of flow through the conduit. However, the contact will be broken and the coil 21 deenergized at the end of such period. When this happens circuit A is broken and the motor 50 stops.

If the motor 50 should stop before contact 59 on arm 58 reaches contact 47 on arm 43 the clutch 55 remains energized by virtue of the holding circuit E above mentioned (which among other things holds circuit B closed). Thus the arm 58 will remain in its then position and will have moved forward to an angular position corresponding to the flow rate and remain in that position as long as the clutch is energized.

It is obvious that simultaneously with the deenergizing of coil 21 of relay 20 and the stopping of motor 50, poles 25 and 26 contact their respective contacts, thereby closing the circuit D and also closing circuit C insofar as relay 20 is concerned (circuit C still being broken between contacts 47 and 59). The closing of circuit D simultaneously energizes the second motor 70 and its clutch. Thus simultaneously with the stopping of synchronous motor 50, the second motor 70 (which as indicated above rotates at a greater speed than the motor 50) begins to run. As clutch 72 is also energized, the arm 75 moves forward. Presently the arm 75 will reach the pointer arm 43 and push it towards arm 58. When the contacts 59 and 47 come together they close circuit C, which short circuits the coil 91 of relay 90, thereby deenergizing it. With the deenergization of coil 91, plunger 92 of relay 90 drops and all of the circuits controlled by it (circuits E, B and D) are broken, whereupon the motor 70 is stopped and simultaneously the two magnetic clutches 72 and 55 are deenergized. The free halves 74 and 57 respectively of the two clutches are returned to their "off" position by the action of the tension springs 76 and 66 respectively. This leaves the pointer arm 43 in the angular position which corresponds to the rate of flow being measured. As the pointer arm 43 is held in its position by any suitable friction device such as spring 46 when it is not being forcibly moved, it will remain in this position until a change in the rate of flow causes it to be moved either to the right or to the left.

In the event that the quantity to be measured in any cycle is greater than that of the preceding cycle, then it is obvious that the motor 50 and the clutch 55 will continue energized so long as the primary circuit is closed, thus causing the arm 58 to rotate through a greater angle and push the arm 43 to a new position. It is obvious that circuits A and E will be closed as they are directly closed by the energization of coil 21 of relay 20. Relay 90 will be energized also as circuit C is broken at relay 20, so that coil 91 is not shunted. Thus the coil 91 remains energized so long as the coil 21 is energized, and consequently magnetic clutch 55 remains energized as long as the motor 50 is operated. However, immediately upon the breaking of the primary circuit, and the consequent deenergizing of coil 21, circuit C is simultaneously reestablished in relay 20 (and was already closed at contacts 47 and 59 when arm 58 contacted pointer 43) thereby short circuiting coil 91 and deenergizing relay 90. This prevents any operation of the motor 70 or its associated clutch 72. Thus when the motor 50 moves the arm 58 through a greater angle than was represented by the previous position of the arm 43, the motor 50 and the magnetic clutch 55 remain energized for a length of time corresponding to the rate of flow to be measured. However, immediately upon the breaking of the primary circuit, the motor 50 is stopped, the clutch 55 is deenergized and the circuits controlling the operation of motor 70 are broken so that the arm 58 returns to its zero position and the arm 75 is not moved from its zero position.

If there is no change in flow rate from one cycle to the succeeding one, then the length of time which the motor 50 moves is exactly equal to that represented by the position of the pointer arm 43, then the contacts 59 and 47 close simultaneously with the deenergizing of coil 21 thus momentarily establishing circuit C to prevent operation of the motor 70.

In some instances it is desirable not to be limited to uniform time intervals between successive operations of motor 50. In prior art devices the cycle was always uniform and when rate of flow was low the period of rest would be much greater than the period of operation of the positioner 40. One form of my invention involves the use of non-uniform time intervals so that upon the return of the arms 75 and 58 to their positions of rest a new cycle is immediately initiated. This permits frequent testing when rates of flow are low. The apparatus of this embodiment is identical with that described in Figure 1 with the following exceptions:

In this embodiment the transmitting element 10 is driven by a synchronous motor 130. However, in this embodiment instead of the cam 12a being placed on the shaft 131 of the motor 130 to rotate constantly with the motor, a magnetic clutch 132 is interposed between the cam 12a and the motor 130. The magnetic clutch 132 has one side, 133, rigidly secured to the shaft 131 of the motor. The other half 134 of the clutch is attached to a driven shaft 135 on which the cam 12a is located. The cam 12a is similar in shape to that of cam 12 of Figure 1, but in addition a tension spring 136 is fastened to the cam to snap it back to its starting position upon deenergizing the magnetic clutch 132. In order to start rotation from a set or zero point, the shaft 135 is preferably provided with a finger 137 which comes in contact with the stop 138 at the zero position.

Preferably the cam 12a will be insulated at the very tip, as shown at 139, so that on very small flows, say up to 4% of the usual flow, there will be no electrical contact between the arm 11a and the cam 12a. I also provide an extension member 140 on the cam, which is adapted to bridge the gap between contacts 141 and 142 when the cam 12a returns to its zero position thus establishing a circuit through conductors 143 and 144, the latter being connected to source of power $L_1$ through conductor 145.

The contact arm 11a differs from that shown in Figure 1 in that it preferably has an extension 120 separated from the arm 11a by an insulator 121. The extension 120 engages a contact strip 122 which is so arranged that at very low flows, say less than 4%, the extension 120 will have overrun the contact strip 122. This construction of the arm 11a is preferred in order to provide means for preventing rotation of cam 12a at extremely low flows, as hereinafter described.

It is also necessary to change the relay 90 from a three pole switch to a four pole switch 90a, with one pole in the closed position when the relay is deenergized. Thus the plunger 92a will carry an additional pole, 150, which, when the coil 91a is deenergized, will be resting upon contacts 151 and 152.

It is also necessary to add to the apparatus two additional relays: 170, which contains a three pole electrical interlocking switch; and 190, which contains a two pole non-interlocking switch—both of which will be described in detail hereafter.

The arm 58 of positioner 40, in this embodiment is also provided with a second contact 160 joined to conductor 143. Associated with contact 160 is a fixed contact 161 which is located at the zero position. Thus, at the start of a measuring cycle the two are in contact with each other. Contact 161 is connected by conductors 162 and 163 to contact 151 of the relays 90a. Contact 161 is also connected by means of conductors 162 and 164 to binding post 178 of the relay 170. Also associated with the contact 160 is a third contact 165 which is so positioned that contact 160 comes in contact therewith when it has traveled a short distance, such as 3 or 4 per cent of the angular travel of arm 58. Contact 165 is connected to binding post 196 of a two pole interlocking relay 190 by conductor 166.

The extension member 140 of the cam 12a is so arranged that it maintains a contact between its associated contact points 141 and 142 for a length of time corresponding to some predetermined portion of the travel of the arm 58 such as 3%. It will be seen that the circuit through contact 160 and the contacts 141 and 142 and the arm 140 will be made through the contact 161 and conductors 162 and 164, as hereinafter described, at the initiation of a cycle and for a short period thereafter. That circuit is broken and shortly thereafter, say after 3% of the travel of the arm 58, a new circuit will be initiated through contact 165 and line 166 as hereinafter described.

The three pole switch 170 (provided with poles 172, 173 and 174) is operated by energizing coil 171 while the two pole switch 190 (provided with poles 192 and 193) is operated by energizing coil 191.

Contact 175 of relay 170 is joined, as shown, to source of power $L_1$ through conductor 145. Conductor 164 leading from the contact 161 terminates at binding post 178 of the relay 170. A conductor 181 leads from the binding post 178 of relay 170 to contact 194 of relay 190. One end of the coil 171 is also connected to binding post 178 and the other to binding post 182, thence through resistor 183 and binding post 184 to source of power $L_2$.

A conductor 185 also leads from binding post 184 to binding post 179 of relay 170. Opposite binding post 179 is contact 176, from which leads conductor 186 to coil 191 of relay 190 and thence to binding post 196 of the same relay.

Binding post 180 is connected to source of power $L_1$ by conductor 187. Contact 177 is connected to the contact strip 122 by conductor 188. The extension 120 is connected to the magnetic clutch 132 by line 123. Conductor 189 leads from the magnetic clutch 132 to source of power $L_2$. Thus the energizing of the relay 170 closes a circuit through the magnetic clutch, thereby energizing it, if the flow is more than the predetermined minimum flow (such as 4%). Of course if the arm 11a is positioned at less than the predetermined minimum the extension 120 has overrun the contact strip 122 and the circuit is maintained open and the clutch is not energized. This construction prevents operation of the cam 12a when flows are at a minimum. Such operation might otherwise be possible, and as the circuits would not be deenergized the cam would otherwise be driven in a complete circle with danger to the motor and clutch mechanism.

Contact 195 of the two pole relay 190 is connected to contact 152 of the relay 90a by conductor 198 and binding post 197 of the two pole switch is connected to binding post 182 by conductor 199.

As the cam 12a is returned to its zero position by the spring 136 and arm 58 is returned to its zero position by spring 60, a circuit F is established leading from source of power $L_1$ through conductors 145 and 144, contact 142, extension member 140, contact 141, conductor 143, contacts 160 and 161, conductors 162 and 164, binding post 178, coil 171, binding post 182, resistor 183 and binding post 184 to source of power $L_2$. This circuit energizes the relay 170 and poles 172, 173 and 174 are moved to contact the contacts 175, 176 and 177 respectively. It will be noted that pole 172 shunts the circuit F just described so that current flows from source of power $L_1$, conductor 145, contact 175, pole 172, coil 171, resistor 183 back to source of power $L_2$. This constitutes a holding circiut and holds the relay 170 energized until the circuit is broken as hereinafter described.

Simultaneously with the closing of this holding circuit, pole 173 also comes in contact with contact 176, but no circuit is established until the arm 58 has moved the predetermined distance, say 3%, so that movable contact 160 comes in contact with the fixed contact 165. Throughout this interval the contact 160 has remained connected to the source of power $L_1$ through circuit F as above described. When the contact 160 moves into contact with the contact point 165, a new circuit F' is established from there through conductor 166, binding post 196 of relay 190, coil 191, conductor 186, contact 176, pole 173, binding post 179, conductor 185, to binding post 184 and thence to source of power $L_2$. This circuit energizes coil 191 to operate the relay 190 to move poles 192 and 193 to the closed position.

Simultaneously with the energizing of coil 171 (which is also simultaneous with the energizing of relay 20 and operation of motor 50 to move arm 58) pole 174 is moved to establish contact between binding post 180 and contact 177, thereby (assuming extension 120 engages contact strip 122) closing the circuit G connected to the magnetic clutch 132, energizing it to drive the cam 12a until the circuit is deenergized as hereinafter described.

It is obvious that as the cam 12a rotates the arm 140 moves out of contact with contact points 141 and 142 so that the circuits F and F' are broken at these points.

When the coil 191 of relay 190 is energized, pole 192 is moved to establish contact between contact 194 and binding post 196 to provide a holding circuit for coil 191 leading from source of power L₁ through conductor 145, contact 175, pole 172, binding post 178, conductor 181, contact 194, pole 192, binding post 196, coil 191, conductor 186, contact 176, pole 173, binding post 179, conductor 185 and binding post 184 to source of power L₂.

The movement of pole 193 to establish contact between contact 195 and binding post 197 connects conductor 198 back to source of power L₂ through conductor 199, binding post 182, resistor 183 and thus to L₂. However no circuit is established as relay 90a is energized and pole 150 is removed from its associated contacts. This circuit therefore does not become effective for the time being and it is not closed until the operation of the positioner 40 and relays 20 and 90a are complete, as described in connection with Figure 1. When however the cycle of operation of the positioner 40 is complete and the arm 58 returns to its zero position and the coil 91a is deenergized, then a circuit is established from L₁, through contact 175, pole 172 and binding post 178 of relay 170, conductors 164 and 163, contact 151, pole 150 and contact 152 of relay 90a, conductor 198, contact 195, pole 193 and binding post 197 of relay 190, conductor 199, resistor 183, binding post 184 to L₂. This short circuits coil 171 and deenergizes both relays 170 and 190. The deenergizing of coil 171 also results in breaking the circuit to the magnetic clutch 132, whereby the spring 136 returns the cam 12a to its zero position which immediately closes circuit F to initiate a new cycle of operation.

Manifestly various modifications and variations of the invention herein described will be apparent to those skilled in the art. Accordingly, the appended claims are to be given an interpretation commensurate with the novelty herein described and as broad as may be permitted by prior art.

I claim:

1. A telemetering system including a transmitter so constructed and arranged as to give an impulse of a time duration proportional to the function being measured, a receiving instrument and a transmission line from said transmitter to said receiving instrument, said receiving instrument comprising a positionable element, a constant speed motor, a magnetic clutch connected to said motor, and a pusher arm connected to said clutch and adapted to push said positionable element in one direction; a second motor, a second magnetic clutch connected to said second motor, a second pusher arm connected to said second clutch and adapted to push said positionable element in the opposing direction, and relay means including a coil in said transmission line adapted to close a circuit controlling operation of said synchronous motor upon the energizing of said coil, to energize said first mentioned magnetic clutch simultaneously with the operation of the synchronous motor and maintain it energized until the last occurring of either the contact of said first pusher arm and said positionable element or the deenergizing of said coil, to close a circuit simultaneously energizing said second motor and said second magnetic clutch upon termination of operation of the first motor and to open said last mentioned circuit when said first pusher arm contacts said positionable member.

2. The apparatus of claim 1 comprising also means for immediately initiating a new cycle of transmission by said transmitting element upon termination of a cycle of operation of the receiving instrument.

3. The apparatus of claim 1 wherein said transmitter comprises a constant speed motor, a magnetic clutch connected to the shaft of said motor, a cam driven by said magnetic clutch, means for returning said cam to a zero position upon deenergizing of said clutch, means for energizing said clutch upon return of said cam to said zero position, and means for deenergizing said clutch upon termination of operation of said receiving instrument.

4. A telemetric receiver comprising a movable member, a first pusher adapted to push said movable member in a forward direction and a second pusher adapted to push said movable member in a reverse direction, a constant speed motor adapted to drive said first pusher, a magnetic clutch connecting said first motor to said first pusher, a second motor adapted to move said second pusher, a magnetic clutch connecting said second motor to said second pusher, a relay adapted to be energized for a period of time corresponding to the quantity to be measured, a circuit from said relay to said constant speed motor, means for closing said circuit for a period corresponding to the energizing of said relay, a second circuit connected to said first magnetic clutch, means for closing said second circuit simultaneously with the closing of said first circuit and including a holding relay adapted to maintain said circuit closed so long as said first relay is energized, and until said first pusher contacts said movable member, a third circuit to said second motor and said second clutch, means for closing said third circuit upon the deenergizing of said first relay and breaking said third circuit when said first pusher comes in contact with said movable member, and means for returning said pushers to their zero position.

5. A telemetering system including a transmitter so constructed and arranged as to give an impulse of a time duration proportional to a function being measured; a receiving instrument, said receiving instrument comprising a positionable element, a constant speed motor, a magnetic clutch connected to said motor, and a pusher connected to said clutch and adapted to push said positionable element in one direction, a second motor, a second magnetic clutch connected to said second motor, a second pusher connected to said second clutch and adapted to push said positionable element in the opposing direction; a transmission line from said transmitter to said receiving instrument; and a relay means including a coil in said transmission line adapted to close a circuit to said constant speed motor so long as said coil is energized, to close a second circuit to said first mentioned magnetic clutch so long as said coil is energized and thereafter to hold said circuit closed so long as the positionable member of said receiving instrument and said first pusher are not contacting one another, and to close a third circuit to said second motor and said second magnetic clutch upon the deenergizing of said coil and to hold said third circuit closed so long as the positionable member of said receiving instrument and said first pusher are not in contact.

6. A telemetering system including a transmitter so constructed and arranged as to give an impulse of a time duration proportional to a function being measured; a receiving instrument, said receiving instrument comprising a positionable element, a constant speed motor, a magnetic clutch connected to said motor, and a pusher connected to said clutch and adapted to push said positionable element in one direction, a second motor, a second magnetic clutch connected to said second motor, a second pusher connected to said second clutch and adapted to push said positionable element in the opposing direction; a transmission line from said transmitter to said receiving instrument; a first relay including a coil in said transmission line; a holding relay; an energizing circuit from said first relay to said holding relay so arranged as to energize said holding relay upon the energizing of said coil; a shunting circuit from said holding relay to the positionable element and said first pusher of the receiving instrument and through a normally closed contact of said first relay, whereby the holding relay is deenergized upon the contacting of said element and said arm and the deenergizing of said first relay; a first motor circuit from a normally open contact of said first relay to said constant speed motor; a first clutch circuit from a normally open contact of said holding relay to said first mentioned magnetic clutch; and a second motor circuit to said second motor and said second magnetic clutch from a normally open contact of said holding relay and a normally closed contact of said first relay.

7. A telemetering system which comprises a receiving instrument, said receiving instrument comprising a positionable element, a constant speed motor, a magnetic clutch connected to said motor, and a pusher connected to said clutch and adapted to push said positionable element in one direction, a second motor, a second magnetic clutch connected to said second motor, a second pusher connected to said second clutch and adapted to push said positionable element in the opposing direction, a first relay, a holding relay, an energizing circuit from a normally open contact of said first relay to said holding relay, a shunting circuit from a normally closed contact of said first relay through the positionable element and the first pusher of the receiving instrument to the holding relay, whereby the holding relay is deenergized upon the combined deenergizing of said first relay and the contacting of said element and said first pusher, a first motor circuit from a normally open contact of said first relay to said constant speed motor, a first clutch circuit from a normally open contact of said holding relay to said first mentioned magnetic clutch, a second motor circuit to said second motor and said second magnetic clutch from a normally open contact of said holding relay and a normally closed contact of said first relay; and a transmitting instrument, said transmitting instrument comprising a member positioned by the quantity to be measured, a cam intermittently contacting said member, said cam being so constructed and arranged as to contact said member for a period of time proportional to the quantity being measured, a constant speed motor, a magnetic clutch connecting said cam to said motor, means for returning said cam to a zero position upon deenergizing of said clutch, means including a relay energized by a circuit closed upon return of the cam and the first pusher of the receiving instrument to their zero positions for immediately reenergizing said clutch, and a shunting circuit to said last mentioned relay from a normally closed contact of said holding relay of the receiving instrument, whereby said clutch is deenergized upon termination of operation of said positionable element of the receiving instrument; and a primary circuit to said first relay of the receiving instrument through said cam and said member positioned by the quantity being measured.

WALTER H. GREEN.

REFERENCES CITED

The following references are of record in the file of this patent:

UNITED STATES PATENTS

| Number | Name | Date |
|---|---|---|
| 2,324,590 | Miner | July 20, 1943 |

FOREIGN PATENTS

| Number | Country | Date |
|---|---|---|
| 651,098 | Germany | Oct. 7, 1937 |